United States Patent [19]

Baker

[11] Patent Number: 5,191,178
[45] Date of Patent: Mar. 2, 1993

[54] VEHICULAR TRANSMISSION SENSOR APPARATUS RESPONSIVE TO GEAR SELECTION

[75] Inventor: Gary A. Baker, North Scituate, R.I.

[73] Assignee: Texas Instruments Incorporated, Dallas, Tex.

[21] Appl. No.: 819,439

[22] Filed: Jan. 10, 1992

[51] Int. Cl.$^5$ .............................................. H01H 9/06
[52] U.S. Cl. ............................................... 200/61.88
[58] Field of Search ................ 200/83 N, 83 P, 61.88, 200/61.89, 61.91

[56] References Cited

U.S. PATENT DOCUMENTS

| | | | |
|---|---|---|---|
| 3,423,549 | 1/1969 | Sondej | 200/61.88 |
| 3,952,174 | 4/1976 | Boulanger et al. | 200/5 A |
| 5,015,808 | 5/1991 | Czarn et al. | 200/83 P |
| 5,049,708 | 9/1991 | Baker | 200/83 P |
| 5,099,092 | 3/1992 | Lauritsen | 200/61.91 |

*Primary Examiner*—J. R. Scott
*Attorney, Agent, or Firm*—Russell E. Baumann; Richard L. Donaldson; Rene E. Grossman

[57] ABSTRACT

A vehicular transmission sensor having an electrical output responsive to gear selection is shown having a plurality of sealed electrical switches mounted within the transmission housing. A cam plate is disposed on a face of detent lever and is movable therewith relative to the switches. The switches are each provided with a follower which moves between switch contacts engaged and switch contacts disengaged positions in dependence on the angular position of the cam plate.

14 Claims, 2 Drawing Sheets

VEHICULAR TRANSMISSION SENSOR APPARATUS RESPONSIVE TO GEAR SELECTION

FIELD OF THE INVENTION

This invention relates generally to vehicular transmissions and more particularly to means to provide an electrical output responsive to gear selection.

BACKGROUND OF THE INVENTION

It is conventional to mount a rotary switch on the transmission housing externally thereof to receive mechanical gear selection inputs from the operator of the vehicle through various linkages and output gear selections to a decoder module and the transmission electronic control unit via electronic signals. The switch includes a quadrant with a selected number of electrical contact segments disposed thereon with each segment providing an output to the decoder module. The manual valve controlling hydraulic operation of the transmission is mechanically coupled to a plate having indexing detents, called a detent lever, mounted on a shaft and pivotably movable therewith. The shaft extends through the transmission housing wall and a switch bar is fixedly attached to the shaft externally of the transmission housing so that when a vehicle operator selects a gear, the switch bar within the rotary switch moves across the quadrant to a predetermined position to engage one or more of the electrical contact segments. In certain systems the electronic control monitors the gear position along with other inputs relative to such things as throttle position, output shaft speed, engine speed, engine load and so on.

Although this switch system is widely used it suffers from certain limitations and disadvantages. Securing the switch housing to the transmission housing in correct angular orientation, either during initial installation or in-service, requires either special tools to align a reference feature of the shaft following component, i.e., the switch bar, to the rotary switch housing or it entails the monitoring of electrical continuity of switch contacts while rotating the housing relative to the shaft. Additionally, locating the switch outside the transmission housing and removed from the manual valve results in an undesirable tolerance build-up involving all the linking elements. Further, the switch is located in a splash zone, particularly when used with four wheel drives, necessitating the provision of sealing means to prevent entry of water. The extra cost for such sealing means including venting tubes and the like adds significantly to the cost of the system.

In copending application Ser. No. 805,215, incorporated herein by means of this reference, a switch system is disclosed and claimed comprising pressure switches mounted on a bracket within the transmission housing and coupled to selected hydraulic passages and having electrical circuit traces on the bracket. A movable contact is operatively connected to the manual valve and is movable therewith so that the position of the movable contact tracks the manual valve position and moves into and out of engagement with stationary contact segments disposed on the bracket. The pressure switch outputs are incorporated into a resistor network with the manual valve position sensor. The system provides a voltage output to the powertrain electronic controller which interprets the output as a particular transmission event, for example, a gear selection.

While this latter system is effective to provide an indication of the gear selected it cannot be used over the full stroke in certain transmission assemblies in which the valve moves inside of the housing. Further, there is a need to provide relatively high and low current switching dependent upon particular gear selections, for example to permit starting only in specific gear selections, to energize reverse lights when in reverse gear, to energize park accessories when in park, etc.

External switches mounted outside the transmission housing or on the operator gear selector have been used for this purpose; however, they suffer from the same problems described above in relation to the position sensors. That is, switches mounted externally of the transmission housing are located in a hostile environment subject to water splash and the like resulting in significant high warranty costs. Further, such switches have inherent problems relating to difficulty involved in installation and are susceptible to changes in alignment relative to the manual valve, particularly switches located in the passenger compartment.

It has been proposed to locate a switching system within the transmission housing using discrete magnets attached to the detent lever along with fixedly positioned magnetic sensors to control energization of the several circuits dependent upon the position of the manual valve; however, temperature changes affect their operation and changes occur to the magnets themselves over time. Further, electromagnetic compatibility of the system presents a problem. The transmission fluid tends to pick up ferromagnetic particles generated by rotating components such as gears which are attracted to the magnets thereby adversely affecting switching sensitivity.

It has also been proposed to place conductive traces on the detent lever and position wipers to engage the traces as the detent lever pivots; however, this has not been satisfactory for several reasons including the difficulty of assuring adequate contact force as well as environmental concerns.

It is therefore an object of the invention to provide an electric switching assembly dependent upon gear selection which is free of the limitations of the prior art mentioned above. Another object is the provision of a switch system which can be located within the transmission housing of a vehicle which is simple, reliable and has improved longevity. Yet another object is the provision of such a system which is easily installed and which requires no post installation adjustment.

Other objects, advantages and details of the transmission sensor and switch system of this invention appear in the following detailed description of preferred embodiments of the invention.

BRIEF SUMMARY OF THE INVENTION

Briefly described, an internal mode switch system for use with motor vehicle transmissions having a detent lever provided with a plurality of detents on an outer edge thereof with a roller spring biased into engagement with the outer edge comprises a cam plate mounted on the detent lever and movable therewith which cooperates with a plurality of electrical switches mounted in an elongated housing having one end mounted on the manual lever shaft of the transmission and an opposite end coupled to the roller attached to the detent spring. A follower is slidably mounted in each switch and biased to project outwardly therefrom into engagement with the cam plate so that as the cam plate moves with the detent lever the follower is caused to move toward and away from movable contact means within each respective switch to cause the contacts of the switch to move into and out of engagement.

According to a feature of the invention the electrical contacts are disposed in a sealed chamber impervious to dirt, water and the like. According to other features of the invention the switches employ high reliability snap acting discs; the cam is coded for each of the switches to provide desired switch output; positive registration of the cam plate and switch housing relative to pertinent datums eliminates adjustment and the system is supplied assembled to the detent lever as a fully tested, readily installed sub-assembly.

BRIEF DESCRIPTION OF THE DRAWINGS

The following detailed description of the preferred embodiment of the invention refers to the drawings in which.

DESCRIPTION OF THE PREFERRED EMBODIMENT

Figure 1:
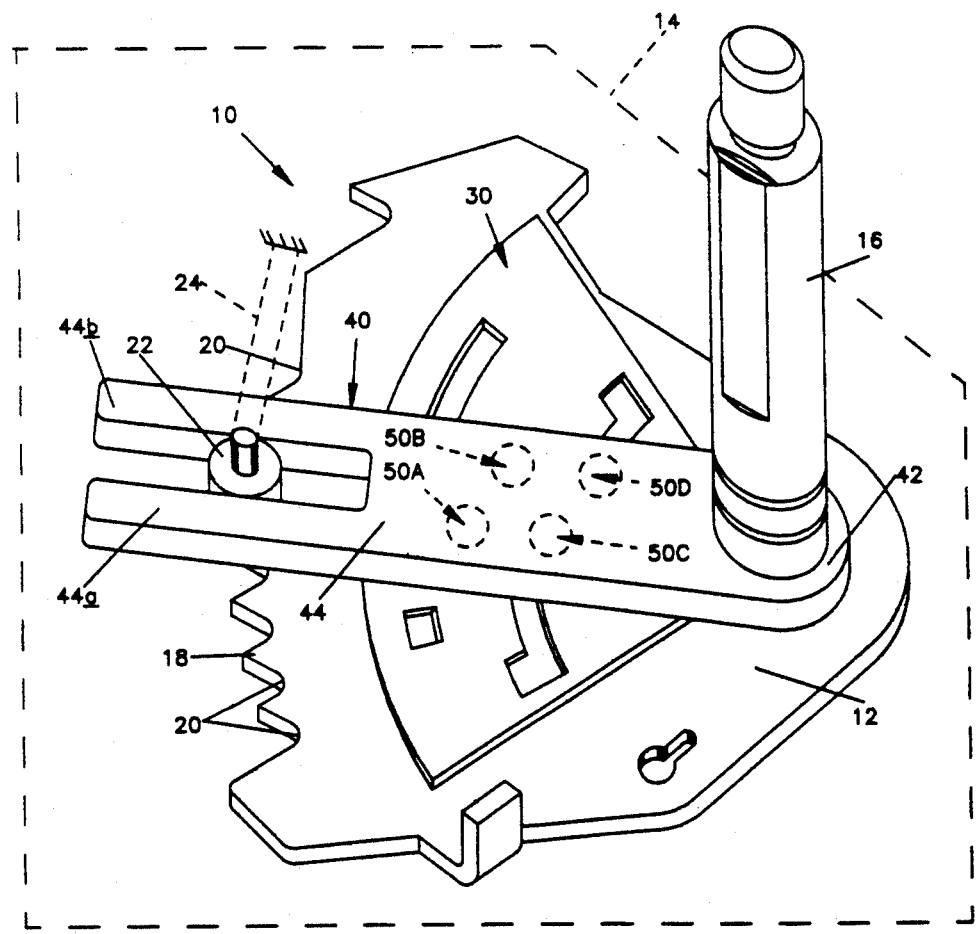
FIG. 1 is a perspective view of a vehicular transmission detent lever mounted on a manual lever shaft incorporating the sensor/switch system made in accordance with the invention.

Referring to the drawings, numeral 10 represents a sensor/switch system made in accordance with the invention. A conventional detent lever 12 is shown disposed in a transmission housing (shown schematically by dashed line 14) mounted on a manual lever shaft 16 which extends outside the transmission housing in a conventional manner. Detent lever 12 has an outer edge 18 having a plurality of detents 20 with a roller 22 biased by detent spring 24 (shown schematically) toward the longitudinal axis of shaft 16 and into engagement with surface edge 18 of the detent lever.

A cam plate 30 is fixedly attached to a face surface of detent lever 12 in any conventional manner and is movable with detent lever 12 as it pivots in response to rotational movement of manual shaft 16 upon shifting by the operator of the vehicle.

A switch housing 40, generally elongated having one end 42 mounted on shaft 16 and an opposite end 44 provided with bifurcated portions or arms 44a and 44b adapted to receive therebetween roller 22 so that housing 40 remains in a fixed axial position as shaft 16 and detent lever 12 pivot. It will be understood that roller 22 is free to move radially between portions 44a and 44b toward and away from the longitudinal axis of shaft 16 as determined by surface edge 18.

A plurality of switches 50 are mounted in housing 40 adapted to cooperate with cam plate 30 to effect opening and closing of circuits in a desired manner determined by the angular position of detent lever 12.

Figure 2:
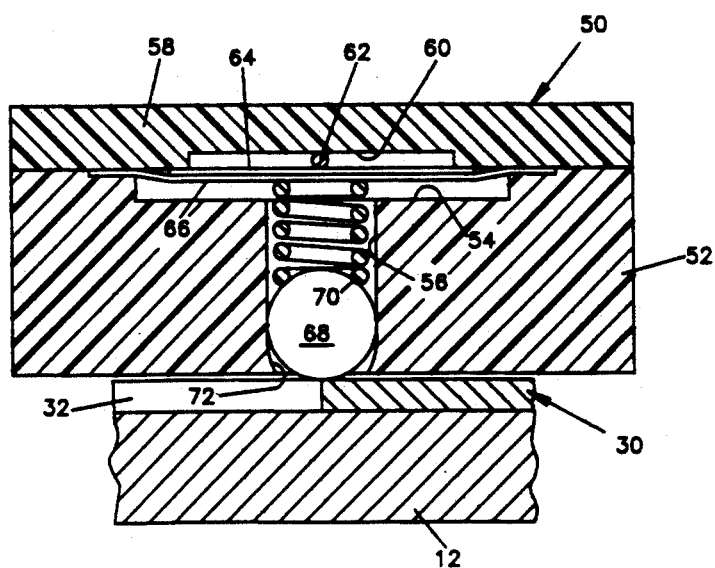
FIG. 2 is a cross sectional view of a switch shown in the actuated, contacts engaged position.

With reference to FIG. 2 one of the switches is shown in cross section. The switch comprises a base 52 formed of suitable material such as a moldable phenolic and has a recess 54 formed in one surface with a bore 56 extending from the recess to a surface in an opposite side of base 52. An upper housing portion 58 received on base 52, formed of suitable moldable, electrically insulative material, has a switching chamber in the form of a recess 60 formed in a surface thereof and has an electrical contact 62 disposed on the bottom of the recess. Contact 62 is preferably connected to the battery and may be an elongated wire like element embedded in housing portion 58 and adapted to extend to a suitable connector as will be described below in connection with FIG. 3. A switching element such as a snap acting, electrically conductive disc 64 is connected to ground and is disposed over recess 60 with a flexible diaphragm 66 received over both recess 60 of upper housing 58 and recess 54 of base 52 to effectively seal the switching chamber.

A spherical element, such as a ball bearing 68 is disposed in bore 56 and is biased away from recess 54 by a suitable spring such as coil spring 70 which extends from ball 68 to diaphragm 66. Bore 56 is preferably formed with an inwardly extending lip 72 to maintain ball 68 within bore 56 during assembly. Ball 68 functions as a follower whose position is dependent upon the position of cam 30.

The switches preferably have no preload thereby preventing unintended switching under vibration. Spring 70 is preferably formed of creep resistant material such as chrome silicon alloy steel to eliminate fatigue and minimize spring set and is chosen to have a low spring rate thereby minimizing cam wear.

As shown in FIG. 2, cam 30 is in engagement with ball 68 forcing the ball inwardly or toward the switch chamber. This movement increases the force on spring 70 causing snap acting disc 64, movable between opposite dished configurations, normally in a downwardly facing convex configuration out of engagement with contact 62 (not shown) to snap to its opposite downwardly facing concave position in engagement with contact 62 (or somewhat flat position due to the limitation of its movement by contact 62) as shown in the figure. Disc 64 is electrically connected to a suitable circuit lead so that a closed circuit is effected in the FIG..2 condition. When detent lever 12 and cam plate 30 move further to the right as viewed in FIG. 2 and ball 68 is allowed to move into space 32 in cam plate 30. The force on disc 64 is decreased allowing the disc to snap back to its normal downwardly facing convex, disengaged position to open the circuit.

Although switches 50 have been described having snap acting switching elements it is within the purview of the invention to employ other switching mechanisms responsive to the movement of a cam follower.

Cam plate 30 is formed with a selected profile such that selected open and closed switch combinations result from each of a selected number, e.g., seven distinct gear states and a default disconnect state, although the particular number of states is a matter of choice and can easily be changed by providing a different number of switches. In the particular embodiment being described one of the four switches either opens or closes with every change in gear position to provide a parity bit as shown in Table I.

TABLE I

| Transmission Position | Code (Pins) | | | |
|---|---|---|---|---|
| | 50A | 50B | 50C | 50D |
| P | 0 | — | — | 0 |
| R | 0 | 0 | — | — |
| N | — | 0 | — | 0 |
| D | — | 0 | 0 | — |
| 3 | 0 | 0 | 0 | 0 |
| 2 | 0 | — | 0 | — |

TABLE I-continued

| Transmission Position | Code (Pins) | | | |
|---|---|---|---|---|
| | 50A | 50B | 50C | 50D |
| 1 | — | — | 0 | 0 |

In table I 0 denotes a closed switch or logic low. The dash denotes an open switch or logic high.

Figure 3:
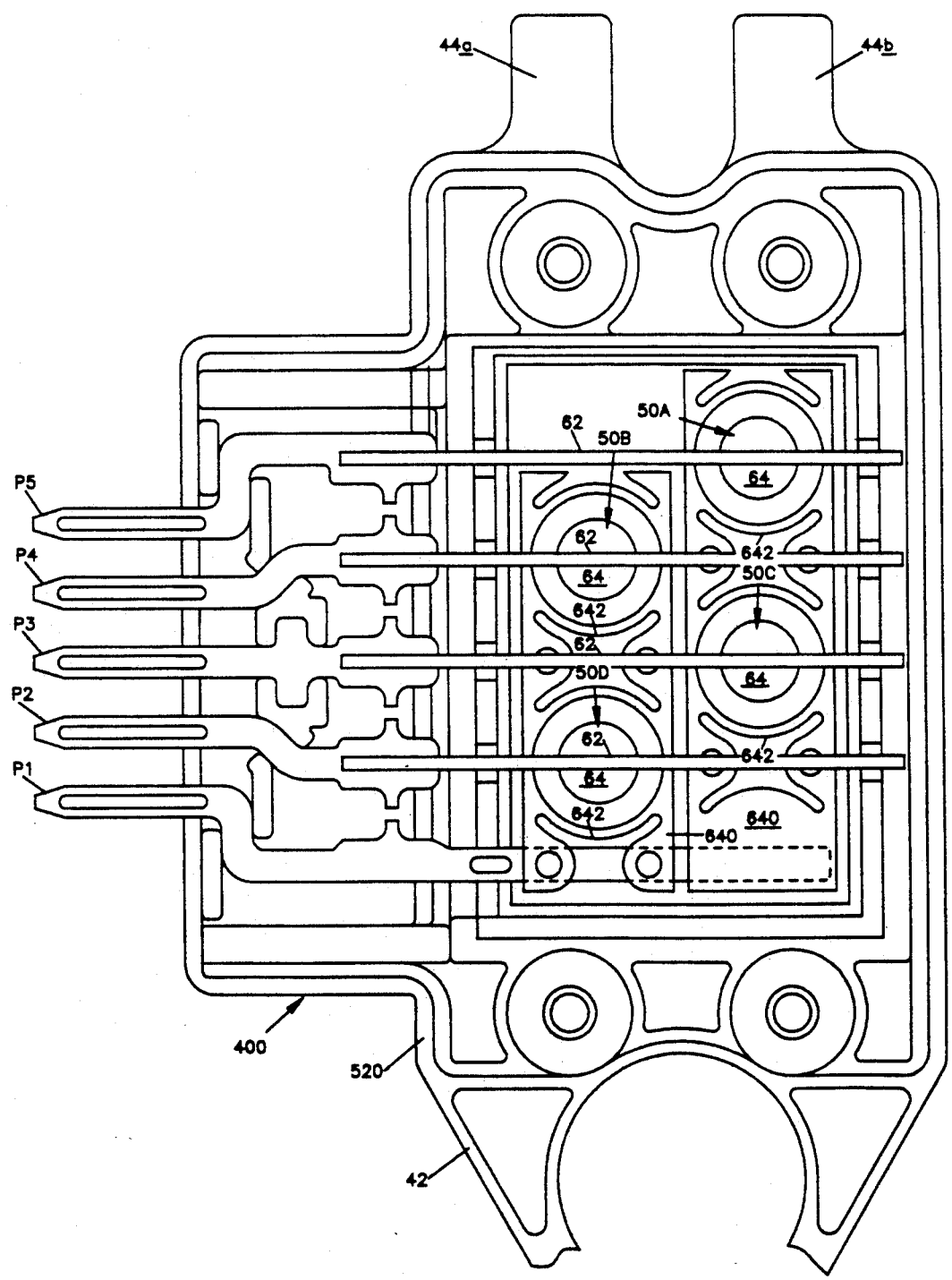
FIG. 3 is a top plan view of a housing useful with the present invention, partly broken away and with the top portion removed for purposes of illustration.

FIG. 3 shows a housing and switch assembly 400 with a top portion removed for illustration useful with the present invention comprising a base 520 in which are disposed pins P1, P2, P3, P4 and P5. Pins P1-P4 are each electrically connected in any conventional manner as by welding, to a respective contact 62. A pair of disc strips 640 have cut-out portions 642 forming switching stations 50A, 50B, 50C and 50D which are each formed into a snap acting disc 64 in a known manner. Pin P1 is electrically connected to strip 640 as by welding thereto. Pin P1 is connectable to ground while pins P2-P5 are connectable to the vehicle battery. Switches made from strips of snap acting discs adapted to move into and out of engagement with a wire like contact embedded in a base member are known in the art and for more specific detail on their construction reference may be had to U.S. Pat. No. 3,952,174 which issued to the assignee of the present invention.

It will be seen that the sensor/switch made in accordance with the invention provides an excellent reference to the mechanical system, i.e., the manual shaft and detent spring; can be completely sealed and utilizes battery voltage operation with no EMC (electric mechanical compatibility) concerns.

Conventional external switches described above in relation to the prior art have three primary functions, i.e., they permit starter engagement in Park and Neutral only, they control back-up lamp operation and they output gear mode by means of a 4 bit code. The Park/Neutral high current start circuit is maintained separate from the PRNDL low current code circuits. The control made in accordance with the present invention provides a code output continuous throughout the gear selector range with no indeterminate states existing upon transfer from one gear selection to the next.

An alternate approach of providing output to enable computer controlled starter operation while preventing unintended vehicle motion during starter operation when transmission manual valve hydraulic overlap exists one of the four bits can be used to exclusively indicate Park and Neutral with the three remaining bits used to indicate appropriate gear selection, such as PRNDL, by means of the code, as shown in Table II.

TABLE II

| Transmission Position | Code (Pins) | | | |
|---|---|---|---|---|
| | 50A | 50B | 50C | 50D (Park/Neutral) |
| P | 0 | — | — | 0 |
| R | 0 | 0 | — | — |
| N | — | 0 | — | 0 |
| D | — | 0 | 0 | — |
| 3 | 0 | 0 | 0 | — |
| 2 | 0 | — | 0 | — |
| 1 | — | — | 0 | — |

A logical check of the decoded three bit output against the P/N switch output can easily be performed to provide fault detection.

Among the advantages provided by the invention include an accurate narrow band for Park and Neutral indication for safe starter operation. The interpretation of the switch assembly output using a decoder or PCM (Powertrain Control Module) to control starter operation provides opportunities for improved control such as prohibiting operation with the engine running, control maximum starter operating time to prevent starter motor overheating and prevent starter engagement during transmission hydraulic operation. The invention provides improved accuracy in gear selection indication by eliminating adjustment and tolerance buildup thereby permitting the assembly output to be used for transmission control strategy. The switch assembly location in the transmission housing prevents physical and handling damage and installation at the time of transmission assembly results in no adjustment being required providing cost and quality improvements.

It will be apparent to those skilled in the art that variations of the structure described can be made to accomplish essentially the same purpose. All such variations within the scope of the claims are intended to be within the scope and spirit of the present invention.

I claim:

1. An internal mode switch for use with motor vehicle transmission apparatus having a detent lever with a plurality of detents formed on an outer edge surface thereof, each detent corresponding to a specific transmission gear selection, the detent lever being pivotable about an axis, a roller, means to mount the roller so that it is movable toward and away from the axis and bias the roller toward the axis, means coupled to the roller including an elongated member having first and second ends, the first end mounted on the axis, the second end having bifurcated generally parallel arms with the roller received between the arms, the motion of the roller toward the axis being limited by the outer edge surface of the detent lever, a cam plate mounted on the detent lever and movable therewith, switch means mounted on the elongated member, the switch means having first and second electrical contacts movable relative to one another between contacts engaged and contacts disengaged positions, follower means extending between the cam plate and electrical contacts, the cam plate causing the follower means to move toward the electrical contacts at a selected angular position of the detent lever to cause the contacts to move into a contacts engaged position and the follower means moving away from the electrical contacts at other angular positions of the detent lever to cause the contacts to move into the contacts disengaged position, and means for electrically energizing the switch and for outputting a signal therefrom corresponding to the respective contacts engaged and disengaged positions.

2. An internal mode switch for use with motor vehicle transmission apparatus according to claim 1 in which the switch means comprises a housing having a recess therein, a stationary contact being disposed in the recess, an electrically conductive snap acting disc means movable between opposite dished configurations disposed in the housing in alignment with the stationary contact adapted to move into and out of engagement with the stationary contact dependent upon its dished configuration, the housing having a surface adjacent the cam plate, a bore being formed in the housing extending from the disc means to the surface, follower means disposed in the bore and biased away from the disc means toward the surface, the follower extending out of the housing in its at rest condition.

3. An internal mode switch for use with motor vehicle transmission apparatus according to claim 2 in which the follower means comprises a spherical ball and a coil spring extending between the disc means and the spherical ball.

4. An internal mode switch for use with motor vehicle transmission apparatus according to claim 3 in which the housing is formed with a lip which extends radially inwardly of the bore to limit outward movement of the spherical ball.

5. An internal mode switch for use with motor vehicle transmission apparatus according to claim 2 in which the disc means includes a flexible diaphragm received over and sealing the recess.

6. An internal mode switch for use with motor vehicle transmission apparatus according to claim 1 in which the switch means comprises four separate switches.

7. An internal mode switch for use with motor vehicle transmission apparatus according to claim 6 including five connector pins, one pin being connectable to ground and the other pins being connectable to battery voltage, the output signal being either a logic high or a logic low, the cam plate being formed with a profile for each switch selected so that one of the switches opens or closes with each change in gear position for seven different gear positions and one switch providing a parity bit.

8. An internal mode switch for use with motor vehicle transmission apparatus according to claim 6 having PRNDL gear positions and having a four bit output code, one bit used exclusively to indicate P and N with the remaining three bits used to indicate the gear position by means of the code.

9. A switch system for use with motor vehicle transmission apparatus having a detent lever with a plurality of detents on an outer edge surface thereof, each detent corresponding to a specific transmission gear selection, the detent lever being pivotable about an axis, a cam plate mounted on the detent lever and movable therewith, a switch housing fixedly mounted adjacent the detent lever, switch means mounted on the switch housing and having first and second electrical contacts movable relative to one another between contacts engaged and contacts disengaged positions, follower means extending between the cam plate and the electrical contacts, the cam plate having a selected profile causing the follower means to move toward the electrical contacts at a selected angular position of the detent lever to cause the contacts to move into a contacts engaged position and the follower means moving away from the electrical contacts at other angular positions of the detent lever to cause the contacts to move into the contacts disengaged position, and means for electrically energizing the switch and for outputting a signal therefrom corresponding to the respective contacts engaged and disengaged position.

10. A switch system for use with motor vehicle transmission apparatus according to claim 9 in which the switch means comprises four separate switches, the transmission having PRNDL gear positions, the switch system having a four bit output code, one bit used exclusively to indicate P and N with the remaining three bits used to indicate the gear position by means of the code.

11. A switch system for use with motor vehicle transmission apparatus according to claim 9 in which the switch means comprises a housing having a recess therein, a stationary contact being disposed in the recess, an electrically conductive snap acting disc means movable between opposite dished configurations disposed in the housing in alignment with the stationary contacts adapted to move into and out of engagement with the stationary contact dependent upon its dished configuration, the housing having a surface adjacent the cam plate, a bore being formed in the housing extending from the disc means to the surface, follower means being disposed in the bore and being biased away from the disc means toward the surface, the follower extending out of the housing in its at rest condition.

12. A switch system for use with motor vehicle transmission apparatus according to claim 11 in which the follower means comprises a spherical ball and a coil spring extending between the disc means and the spherical ball.

13. A switch system for use with motor vehicle transmission apparatus according to claim 12 in which the housing is formed with a lip which extends radially inwardly of the bore to limit outward movement of the spherical ball.

14. A switch system for use with motor vehicle transmission apparatus according to claim 11 in which the disc means includes a flexible diaphragm received over and sealing the recess.

* * * * *